May 3, 1938.  W. O. HEBLER  2,116,239
GAS ANALYSIS CELL OF THE THERMAL CONDUCTIVITY TYPE
Filed Jan. 29, 1937
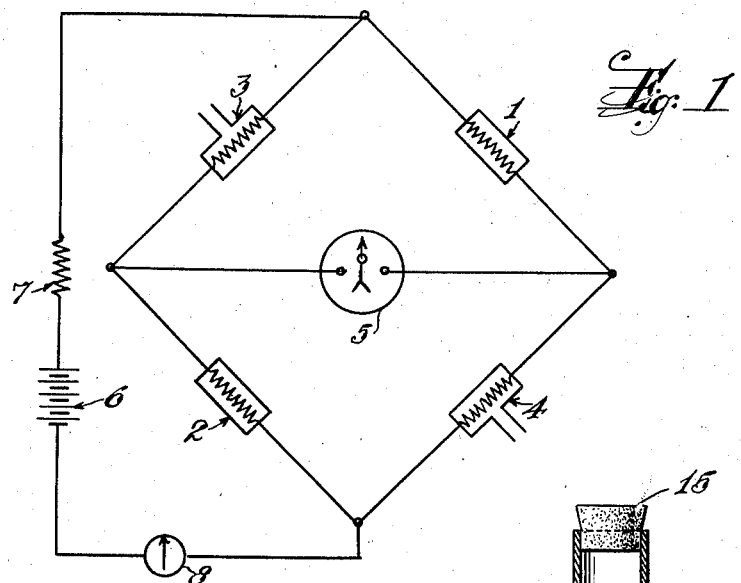
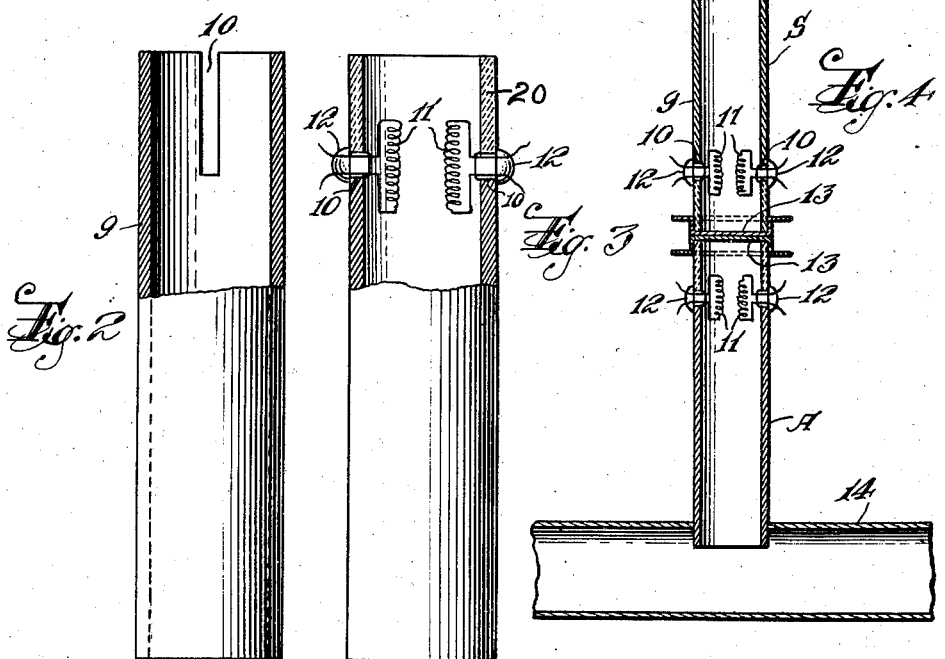
INVENTOR
William O. Hebler
BY Fred C. Fischer
ATTORNEY Patented May 3, 1938

2,116,239

UNITED STATES PATENT OFFICE 2,116,239

GAS ANALYSIS CELL OF THE THERMAL CONDUCTIVITY TYPE

William O. Hebler, Westfield, N. J.

Application January 29, 1937, Serial No. 122,959

4 Claims. (Cl. 73—51)

This invention relates to improvements in gas analysis cells of the thermal conductivity type.

Heretofore, thermal conductivity cells have been made by mounting resistance elements, which are usually made from wires of platinum or tungsten, in solid blocks of metal, preferably of high thermal conductivity. One or more holes are drilled into the block to accommodate the resistance elements for the standard cell and one or more holes are drilled in the block to accommodate the resistance elements for the analysis cell. In other instances, the resistance elements are mounted in suitable tubes or pipe T, said pipe T's being placed in thermal relation to one another by means of a metal strip in order to provide heat transfer from the pipe T forming the analysis cell to the pipe T serving as the standard cell.

The usual gas analysis cell includes what is known as a standard and an analyzing cell; and a galvanometer of the millivoltmeter type is connected suitably into a Wheatstone bridge circuit of which the standard and analyzing cells are a part. It is, therefore, possible to pass a known gas through the analyzing cell when the standard cell is filled with air or another comparison gas, and dependent on the thermal conductivity of the gas, the Wheatstone bridge circuit becomes unbalanced or balanced depending on the starting point. The result is a difference in the flow of current through the bridge and also the galvanometer. As the percentage of gas increases or decreases, the heat dissipation in the analyzing cell increases or decreases accordingly; hence the instrument can be calibrated to read in terms of percentage.

The Bureau of Standards Technologic Paper #249 by Messrs. Palmer and Weaver described in detail the thermal conductivity method of gas analysis. For further reference, the book, "Gas Analysis" by Daynes, published by the Cambridge University Press, London, England, serves as a very satisfactory reference treatise.

Most gas analysis cells of the type referred to in the Bureau of Standards Technologic Paper #249 or in the book by Daynes are subject to error because of the impossibility of placing the standard cell in intimate thermal relation with the analyzing cell. Therefore, if there is an outside change of atmospheric temperature, a considerable length of time is required before the standard cell and analyzing cell reach temperature equilibrium. This condition is known as a temperature coefficient of the cell and it is responsible for considerable error in the reading if the outside temperature change takes place while the reading is being made. Then, too, a considerable length of time is required for the cells to reach equilibrium when the instrument is placed in operation. Unless sufficient time is allowed the instrument cannot be suitably balanced. Most of the cells referred to are expensive to produce.

It is, therefore, an object of this invention, to provide a thermal conductivity gas analysis apparatus in which the standard and analyzing cells are mounted close to each other and arranged so that the two cells are substantially always in thermal equilibrium and unaffected by outside changes of atmospheric temperature.

A further object of the invention is to provide gas analysis apparatus of the thermal conductivity type in which the cells are mounted and arranged in close relation to one another with a very thin metallic wall separating them.

By means of this structure, the cells can be made of "Bakelite" or any other material of high or low thermal conductivity because of the small metallic separator of high thermal conductivity which serves as a heat dissipating medium for both cells and at the same time provides a suitable seal between the cells.

The construction, due to its ability to attain rapid thermal equilibrium, enables rapid readings of the percentages of the gas being analyzed and minimizes errors which might result from changes in atmospheric temperature.

It is a further object of the invention to provide a simplified means for mounting resistance elements in gas analysis cells without materially affecting the cost of the cell, and at the same time greatly increasing the sensitivity of the cell.

These and other advantageous objects, which will later appear, are accomplished by the simple and practical construction and arrangement of parts hereinafter described and exhibited in the accompanying drawing, forming part hereof, and in which:

Fig. 1 is a wiring diagram of the thermal conductivity apparatus including the Wheatstone bridge and gas analysis cell, Fig. 2 is a sectional view of an analysis cell before the resistance element has been mounted therein, Fig. 3 is a sectional view of an analysis cell showing resistance elements mounted therein, and Fig. 4 is a sectional view of a gas analysis apparatus of the thermal conductivity type embodying my invention mounted on a pipe through which the gas to be analyzed passes.

Referring to the drawing, in the wiring diagram in Fig. 1 there is shown a Wheatstone bridge circuit, with standard resistances 1 and 2, and analyzing resistance elements 3 and 4, the Wheatstone bridge circuit including the usual galvanometer 5. Current is supplied to the galvanometer by means of a battery 6 through a resistance 7, and the strength of the current is noted by means of an ammeter 8. The above circuit is well known and is the usual circuit employed in gas analysis apparatus of the thermal conductivity type.

In Fig. 2 is shown, partly in section, a cell used in the apparatus, which cell comprises a small tube 9 having at one end thereof a slot 10. The tube 9 is preferably made of "Bakelite" or similar material. However, the tube can be made of almost any material whether the thermal conductivity thereof is high or low.

The structure of the analysis cell and of the standard cell used in the apparatus is substantially the same. In each cell, the resistance elements 11 which are generally made of platinum or tungsten wire, are attached to buttons 12 of insulating material which are slid through the slots 10 into proper position in the cell as shown in Fig. 3. After the buttons have been positioned in the cell, the slots 10 are filled with a cementitious material 20 to provide a substantially airtight wall.

One end of each cell rests in a cup-shaped member 13 which is preferably made of brass, copper, or other metal having high thermal conductivity. The tubes 9 are firmly secured to the cups 13 by cement and, referring to Fig. 4, the standard cell S is positioned on top of the analysis cell A with the respective heat dissipating cup 13 of the two cells joined to each other. The standard cell is sealed from the outside air by means of a stopper 15, cement, or other expedient.

In operation, the gas being analyzed is passed through a pipe 14 in which a hole is drilled to accommodate the open end of the analysis cell A. If the gas in the pipe 14 has different thermal characteristics than the gas in the standard cell S, the Wheatstone bridge will become unbalanced and there will be an indication thereof by the galvanometer.

From the above description it will be seen that I have provided an unusually simple and compact arrangement of cells in a gas analysis apparatus of the thermal conductivity type, which cells can be obviously manufactured at an extremely low cost compared to the cost heretofore necessary to manufacture satisfactory gas analysis cells.

The above described structure in which the cells are made of material such as "Bakelite" and separated by heat dissipating discs 13, which are made of a metal having high thermal conductivity, enables the rapid attaining of thermal equilibrium between the two cells and minimizes the effect of atmospheric temperature changes. Also the novel manner of mounting the resistance elements in the cells as above described enables accurate positioning of such elements with a minimum of skill and labor. This feature is of considerable importance in view of the fact that the cells are about one quarter inch in diameter and about an inch long. The resistance heating elements are about ⅛ inch long and about 1/64 inch in diameter.

The foregoing disclosure is to be regarded as descriptive and illustrative only, and not as restrictive or limitative of the invention, of which obviously embodiments may be constructed, including many modifications, without departing from the spirit and scope of the invention set forth in the appended claims.

Having thus described my invention, what I claim as new and desire to secure by Letters Patent, is:

1. In a gas analysis apparatus of the thermal conductivity type, an analysis cell comprising a tube made of a non-metallic material having diametrically arranged slots at one end thereof, buttons of insulating material positioned in the slots, resistance elements mounted on said buttons, and cementitious material filling said slots.

2. In a gas analysis apparatus of the thermal conductivity type, a gas analysis cell and a standard cell mounted end to end, each of said cells comprising a tube of non-metallic material having diametrically arranged slots at one end thereof, buttons of insulating material positioned in the bottom of said slots, resistance elements mounted on said buttons, a non-metallic material filling said slots to provide the tube with a substantially air-tight wall, and metallic discs of high thermal conductivity separating said cells.

3. In a gas analysis apparatus of the thermal conductivity type, an analysis cell comprising a tube having slots at one end thereof, buttons of insulating material positioned at the bottoms of said slots, resistance elements mounted on said buttons, and a non-metallic material filling said slots to provide a tube with a substantially air-tight wall.

4. In a gas analysis apparatus of the thermal conductivity type, an analysis cell and a standard cell placed end to end, resistance elements mounted in said cells, and metal cups of high thermal conductivity secured to the adjacent ends of said cells, said cups being secured together.

WILLIAM O. HEBLER.